(12) United States Patent
Park et al.

(10) Patent No.: US 11,611,120 B2
(45) Date of Patent: Mar. 21, 2023

(54) BATTERY MODULE, BATTERY PACK COMPRISING BATTERY MODULE, AND VEHICLE COMPRISING BATTERY PACK

(71) Applicant: LG Chem, Ltd., Seoul (KR)

(72) Inventors: Sang-Jun Park, Daejeon (KR); Gyu-Jong Bae, Daejeon (KR)

(73) Assignee: LG Energy Solution, Ltd.

( * ) Notice: Subject to any disclaimer, the term of this patent is extended or adjusted under 35 U.S.C. 154(b) by 284 days.

(21) Appl. No.: 16/971,852

(22) PCT Filed: Aug. 22, 2019

(86) PCT No.: PCT/KR2019/010700
§ 371 (c)(1),
(2) Date: Aug. 21, 2020

(87) PCT Pub. No.: WO2020/054997
PCT Pub. Date: Mar. 19, 2020

(65) Prior Publication Data
US 2021/0013563 A1  Jan. 14, 2021

(30) Foreign Application Priority Data
Sep. 13, 2018 (KR) .................. 10-2018-0109835

(51) Int. Cl.
*H01M 10/6556* (2014.01)
*H01M 10/625* (2014.01)
(Continued)

(52) U.S. Cl.
CPC ..... *H01M 10/6556* (2015.04); *H01M 10/625* (2015.04); *H01M 10/653* (2015.04);
(Continued)

(58) Field of Classification Search
CPC .......... H01M 10/6556; H01M 10/625; H01M 10/653; H01M 10/655; H01M 10/6551;
(Continued)

(56) References Cited

U.S. PATENT DOCUMENTS

2011/0003185 A1* 1/2011 Kritzer ............... H01M 50/293
429/120
2011/0052960 A1 3/2011 Kwon et al.
(Continued)

FOREIGN PATENT DOCUMENTS

EP  2879228 A1  6/2015
EP  3343672 A1  7/2018
(Continued)

OTHER PUBLICATIONS

International Search Report for Application No. PCT/KR2019/010700 dated Nov. 28, 2019, 2 pages.
(Continued)

*Primary Examiner* — Cynthia H Kelly
*Assistant Examiner* — Jenna Shulman
(74) *Attorney, Agent, or Firm* — Lerner, David, Littenberg, Krumholz & Mentlik, LLP

(57) ABSTRACT

A battery module according to an embodiment of the present disclosure includes: at least one battery cell; a bus bar assembly connected to an electrode lead of the at least one battery cell and positioned on both side surfaces of the at least one battery cell; and a heatsink assembly positioned in direct contact with both of the at least one battery cell and the bus bar assembly while surrounding both of the at least one battery cell and the bus bar assembly.

10 Claims, 5 Drawing Sheets

(51) Int. Cl.
    *H01M 10/653*     (2014.01)
    *H01M 10/6551*     (2014.01)
    *H01M 10/655*     (2014.01)
    *H01M 50/50*     (2021.01)
    *H01M 50/211*     (2021.01)
    *H01M 10/617*     (2014.01)

(52) U.S. Cl.
    CPC ..... *H01M 10/655* (2015.04); *H01M 10/6551* (2015.04); *H01M 50/211* (2021.01); *H01M 50/50* (2021.01); *H01M 10/617* (2015.04); *H01M 2220/20* (2013.01)

(58) Field of Classification Search
    CPC ............. H01M 50/531; H01M 10/617; H01M 2220/20
    See application file for complete search history.

(56) References Cited

U.S. PATENT DOCUMENTS

| | | |
|---|---|---|
| 2013/0244067 A1 | 9/2013 | Tonozuka et al. |
| 2015/0132611 A1 | 5/2015 | Feuillard et al. |
| 2015/0194714 A1 | 7/2015 | You et al. |
| 2015/0303537 A1 | 10/2015 | Jung et al. |
| 2018/0069277 A1 | 3/2018 | Mastrandrea et al. |
| 2018/0090798 A1* | 3/2018 | Valencia, Jr. ....... H01M 10/625 |
| 2018/0151927 A1 | 5/2018 | An et al. |
| 2018/0248237 A1 | 8/2018 | Postler et al. |
| 2019/0074557 A1 | 3/2019 | Shin et al. |
| 2019/0334218 A1 | 10/2019 | Choi et al. |

FOREIGN PATENT DOCUMENTS

| | | |
|---|---|---|
| EP | 3361554 A1 | 8/2018 |
| FR | 3015126 A1 | 6/2015 |
| JP | 2010272403 A | 12/2010 |
| JP | 2012119176 A | 6/2012 |
| JP | 2013229266 A | 11/2013 |
| JP | 2014216298 A | 11/2014 |
| JP | 2015122165 A | 7/2015 |
| KR | 20140014413 A | 2/2014 |
| KR | 20140056835 A | 5/2014 |
| KR | 101642326 B1 | 7/2016 |
| KR | 20170021122 A | 2/2017 |
| KR | 20170059178 A | 5/2017 |
| KR | 20170095052 A | 8/2017 |
| KR | 20170142445 A | 12/2017 |
| KR | 20180007436 A | 1/2018 |

OTHER PUBLICATIONS

Extended European Search Report including Written Opinion for Application No. 19859100.0 dated Mar. 15, 2021, 7 pages.

* cited by examiner

BATTERY MODULE, BATTERY PACK COMPRISING BATTERY MODULE, AND VEHICLE COMPRISING BATTERY PACK

CROSS-REFERENCE TO RELATED APPLICATIONS

The present application is a national phase entry under 35 U.S.C. § 371 of International Application No. PCT/KR2019/010700 filed Aug. 22, 2019, which claims priority from Korean Patent Application No. 10-2018-0109835 filed on Sep. 13, 2018, the disclosures of which are incorporated herein by reference

TECHNICAL FIELD

The present disclosure relates to a battery module, a battery pack including the battery module, and a vehicle including the battery pack.

BACKGROUND ART

Secondary batteries, which are highly useful in various products and exhibit superior electrical properties such as high energy density, etc., are commonly used not only in portable devices but also in electric vehicles (EVs) or hybrid electric vehicles (HEVs) driven by electrical power sources. The secondary battery is drawing attention as a new energy source for its environmental friendliness and energy efficiency, in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module having at least one battery cell first, and then configure a battery pack by using at least one battery module and adding other components.

Recently, as the battery capacity and output are gradually increased, better cooling performance tends to be demanded for the conventional battery module or pack. To this end, recently, the total length of a battery cell, for example a pouch-type secondary battery, has been increasing in order to increase energy.

However, as the total length of the pouch-type secondary battery becomes longer, the temperature deviation inside the battery cell increases. In addition, due to the heat generated from an electrode lead of the pouch-type secondary battery, a region near the electrode lead locally has a higher temperature than other regions.

Thus, it is required to find a way of solving the cooling temperature deviation of the battery cell when the battery module or battery pack is cooled.

DISCLOSURE

Technical Problem

The present disclosure is directed to providing a battery module, which may improve a cooling temperature deviation of a battery cell, a battery pack including the battery module, and a vehicle including the battery pack.

Technical Solution

In one aspect of the present disclosure, there is provided a battery module, comprising: at least one battery cell; a bus bar assembly connected to an electrode lead of the at least one battery cell and provided to both side surfaces of the at least one battery cell; and a heatsink assembly provided to directly contact the at least one battery cell and the bus bar assembly while surrounding the at least one battery cell and the bus bar assembly.

The bus bar assembly may include: a bus bar housing mounted to both sides of the at least one battery cell; a connection bus bar provided to the bus bar housing to contact the electrode lead of the at least one battery cell; and a heat transfer member configured to guide the connection bus bar or the electrode lead to be connected to the heatsink assembly.

The heat transfer member may be mounted to the connection bus bar to directly contact the connection bus bar and the heatsink assembly, respectively.

The heat transfer member may be made of a thermal interface material.

The heatsink assembly may include: a lower heatsink configured to cover a lower side of the at least one battery cell and the bus bar assembly; an upper heatsink disposed opposite to the lower heatsink and configured to cover an upper side of the at least one battery cell and the bus bar assembly; and a pair of side heatsinks configured to connect the upper heatsink and the lower heatsink and cover both sides of the bus bar assembly.

The lower heatsink may have an internal flow path connected to a coolant supply unit that supplies a coolant from the outside, the internal flow path allowing the coolant to flow therethrough, and the upper heatsink may have an internal flow path connected to a coolant discharge unit that discharges the coolant to the outside, the internal flow path allowing the coolant to flow therethrough.

The pair of side heatsinks may have respective internal flow paths communicating with the internal flow paths of the lower heatsink and the upper heatsink.

The coolant supplied from the coolant supply unit may flow along the internal flow paths of the lower heatsink, the pair of side heatsinks and the upper heatsink to the coolant discharge unit.

In addition, the present disclosure provides a battery pack, comprising: at least one battery module according to the above embodiments; and a pack case configured to package the at least one battery module.

Moreover, the present disclosure provides a vehicle, comprising at least one battery pack according to the above embodiment.

Advantageous Effects

According to various embodiments as above, it is possible to provide a battery module, which may improve a cooling temperature deviation of a battery cell, a battery pack including the battery module, and a vehicle including the battery pack.

DESCRIPTION OF DRAWINGS

The accompanying drawings illustrate a preferred embodiment of the present disclosure and, together with the foregoing disclosure, serve to provide further understanding of the technical features of the present disclosure, and thus, the present disclosure is not construed as being limited to the drawings.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but rather the dimensions of some components may be exaggerated.

Figure 1:
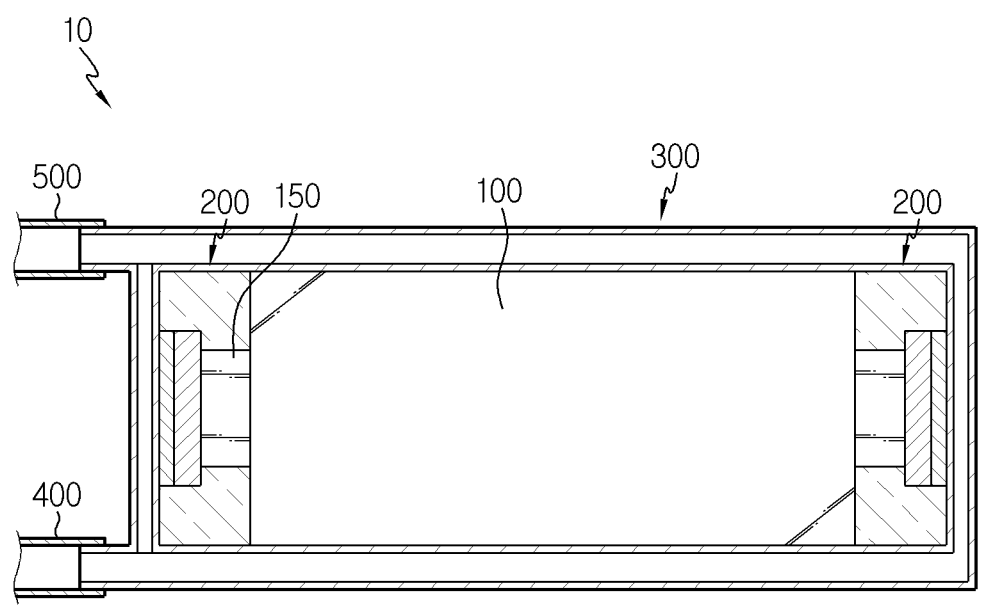
FIG. 1 is a schematic diagram for illustrating a battery module according to an embodiment of the present disclosure.
Figure 2:
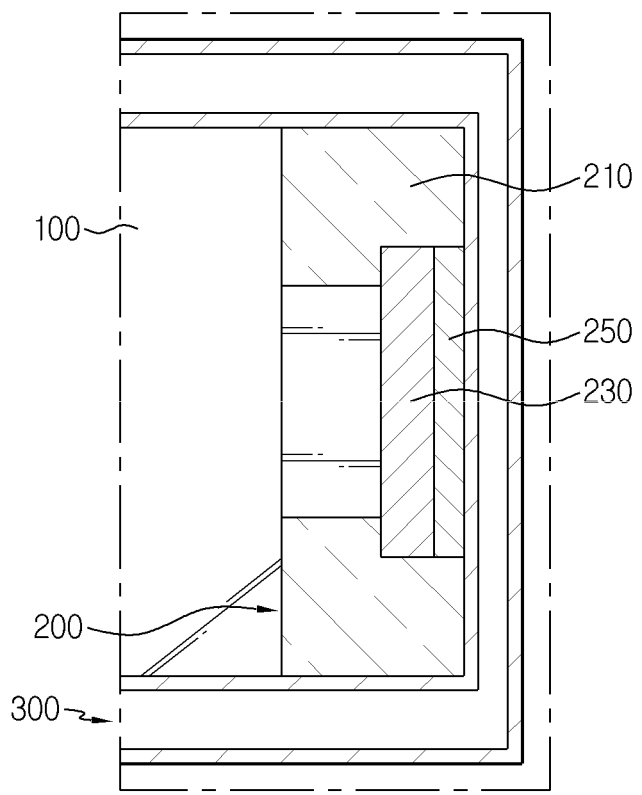
FIG. 2 is an enlarged view of a portion of FIG. 1, illustrating a bus bar assembly of the battery module.
Figure 3:
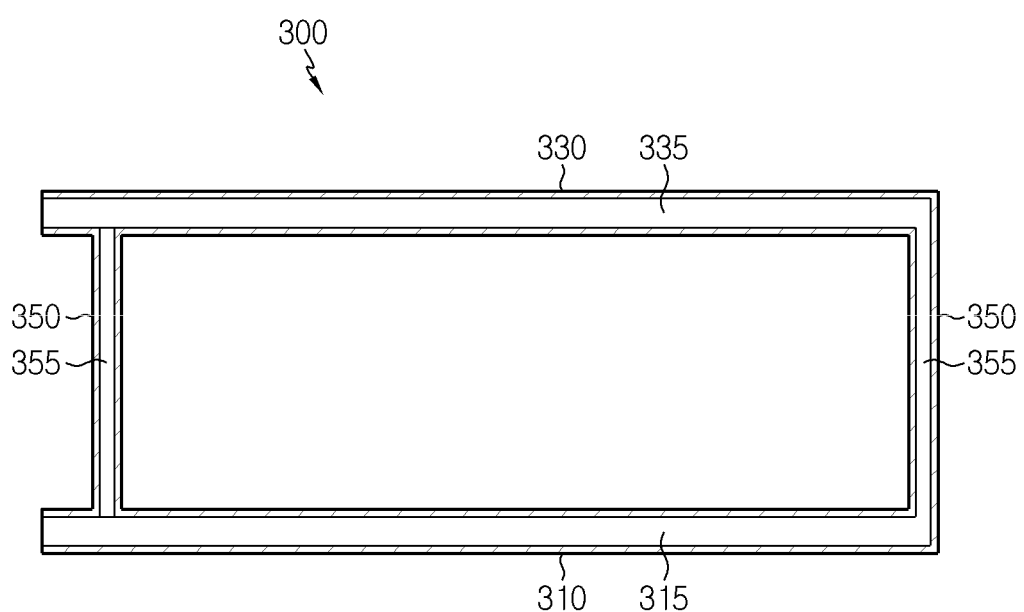
FIG. 3 is a schematic diagram for illustrating a heatsink assembly of the battery module of FIG. 1.

FIG. 1 is a schematic diagram for illustrating a battery module according to an embodiment of the present disclosure, FIG. 2 is an enlarged view of a portion of FIG. 1, illustrating a bus bar assembly of the battery module, and FIG. 3 is a schematic diagram for illustrating a heatsink assembly of the battery module of FIG. 1.

Referring to FIGS. 1 to 3, a battery module 10 may include a battery cell 100, a bus bar assembly 200, and a heatsink assembly 300.

The battery cell 100 is a secondary battery and may be a pouch-type secondary battery, a square secondary battery or a cylindrical secondary battery. Hereinafter, in this embodiment, the battery cell 100 will be explained as a pouch-type secondary battery.

The battery cell 100 may be provided as at least a single battery cell or as a plurality of battery cells. When a plurality of battery cells 100 are provided, the plurality of battery cells 100 may be electrically connected to each other.

The bus bar assembly 200 is connected to an electrode lead 150 of the at least one battery cell 100 and may be provided at both side surfaces of the at least one battery cell 100.

The bus bar assembly 200 may include a bus bar housing 210, a connection bus bar 230, and a heat transfer member 250.

The bus bar housing 210 may be mounted to both sides of the at least one battery cell 100 and may cover both sides of the at least one battery cell 100. The bus bar housing 210 may be sized to cover both sides of the at least one battery cell 100.

The connection bus bar 230 is provided to the bus bar housing 210 and may be in contact with the at least one electrode lead 150 for electrical connection with the at least one battery cell 100. The connection bus bar 230 may be fixed to the at least one electrode lead 150 by laser welding or the like.

The heat transfer member 250 may guide the connection bus bar 230 or the electrode lead 150 to be connected to the heatsink assembly 300, explained later. In detail, the heat transfer member 250 may be mounted to the connection bus bar 230 and directly contact the connection bus bar 230 and the heatsink assembly 300, respectively. The heat transfer member 250 may be made of a thermal interface material with high heat transfer efficiency.

The heatsink assembly 300 may directly contact the at least one battery cell 100 and the bus bar assembly 200 while surrounding the at least one battery cell 100 and the bus bar assembly 200.

In this embodiment, since the heatsink assembly 300 covers the at least one battery cell 100 and the bus bar assembly 200, a separate component such as a module case may be omitted.

Accordingly, in this embodiment, the battery module 10 having a slimmer and more compact structure may be implemented by omitting the separate component such as a module case.

Hereinafter, the heatsink assembly 300 will be described in more detail.

The heatsink assembly 300 may include a lower heatsink 310, an upper heatsink 330, and a side heatsink 350.

The lower heatsink 310 may cover a lower side of the at least one battery cell 100 and the bus bar assembly 200.

The lower heatsink 310 is connected to a coolant supply unit 400 that supplies a coolant from the outside, and may have an internal flow path 315 through which the coolant flows.

The upper heatsink 330 is disposed opposite to the lower heatsink 310 and may cover an upper side of the at least one battery cell 100 and the bus bar assembly 200.

The upper heatsink 330 is connected to a coolant discharge unit 500 that sends the coolant to the outside, and may have an internal flow path 335 through which the coolant flows.

The side heatsink 350 may be provided in a pair. The pair of side heatsinks 350 may connect the upper heatsink 330 and the lower heatsink 310 and cover both sides of the bus bar assembly 200.

The pair of side heatsinks 350 may respectively have an internal flow path 355 communicating with the internal flow paths 315, 335 of the lower heatsink 310 and the upper heatsink 330.

Hereinafter, the heat transfer path and the coolant flow of the battery module 10 according to this embodiment will be described in more detail.

Figure 4:
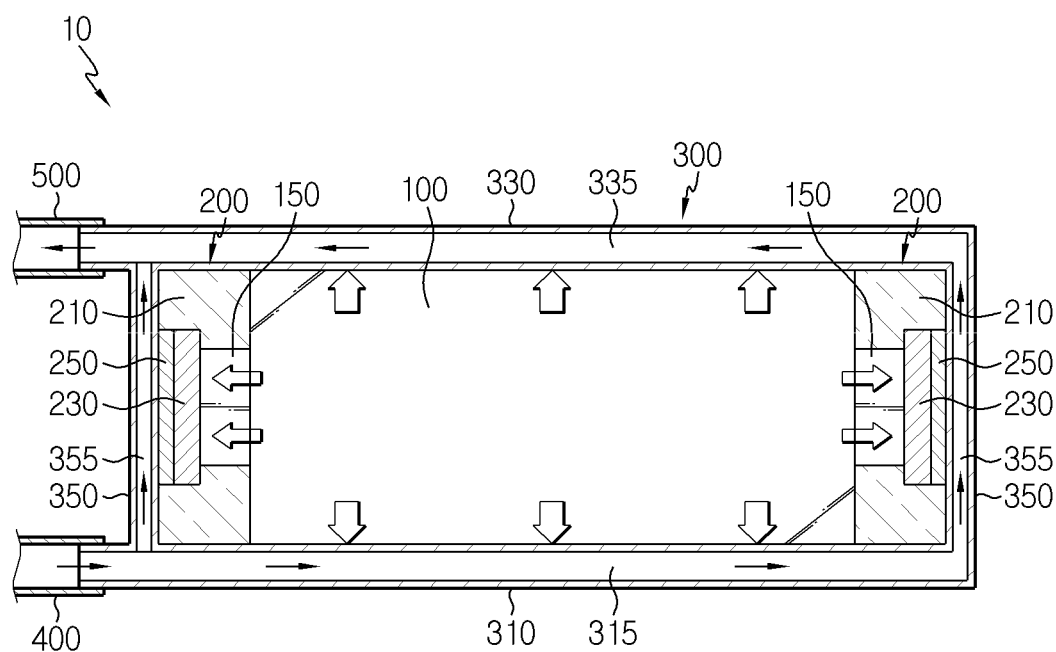
FIG. 4 is a schematic diagram for illustrating a heat transfer path and a coolant flow of the battery module of FIG. 1.

FIG. 4 is a schematic diagram for illustrating a heat transfer path and a coolant flow of the battery module of FIG. 1.

Referring to FIG. 4, when the at least one battery cell 100 generates heat, the heat generated from the upper and lower sides of the at least one battery cell 100 may be transferred to the lower heatsink 310 and the upper heatsink 330 of the heatsink assembly 300. The lower heatsink 310 and the upper heatsink 330 may cool the upper and lower sides of the at least one battery cell 100 due to the internal coolant flow.

In addition, the heat generated from both sides of the at least one battery cell 100, namely from the electrode lead 150 and the connection bus bar 230 of the bus bar assembly 200, may be transferred to the pair of side heatsinks 350 of the heatsink assembly 300.

Here, the heat transfer member 250 of the bus bar assembly 200 may allow the heat generated at the electrode lead 150 of the at least one battery cell 100 and the connection bus bar 230 to be transferred to the pair of side heatsinks 350 more rapidly.

The pair of side heatsinks 350 may cool the electrode lead 150 of the at least one battery cell 100 and the connection bus bar 230 due to the internal coolant flow.

Seeing the flow of the coolant, the coolant supplied from the coolant supply unit 400 may flow along the internal flow path 315 of the lower heatsink 310, the internal flow path 355 of the pair of side heatsinks 350 and the internal flow path 335 of the upper heatsink 330, and then be discharged to the coolant discharge unit 500.

In this embodiment, the pair of side heatsinks 350 contacting the bus bar assembly 200 may effectively cool the heat generated at the electrode lead 150 of the at least one battery cell 100 and the connection bus bar 230. In addition, the cooling efficiency may be further improved through the heat transfer member 250 in direct contact with the pair of side heatsinks 350.

As such, in this embodiment, a cooling deviation in the at least one battery cell 100, in which a region close to the electrode lead 150 is locally heated greater than other regions due to the heat generated at the electrode lead 150 of the at least one battery cell 100, may be effectively prevented by means of the pair of side heatsinks 350.

Thus, in this embodiment, the cooling temperature deviation that may occur in cooling the at least one battery cell 100 may be significantly improved by means of the heat transfer member 250 of the bus bar assembly 200 and the heatsink assembly 300 having the pair of side heatsinks 350.

Figure 5:
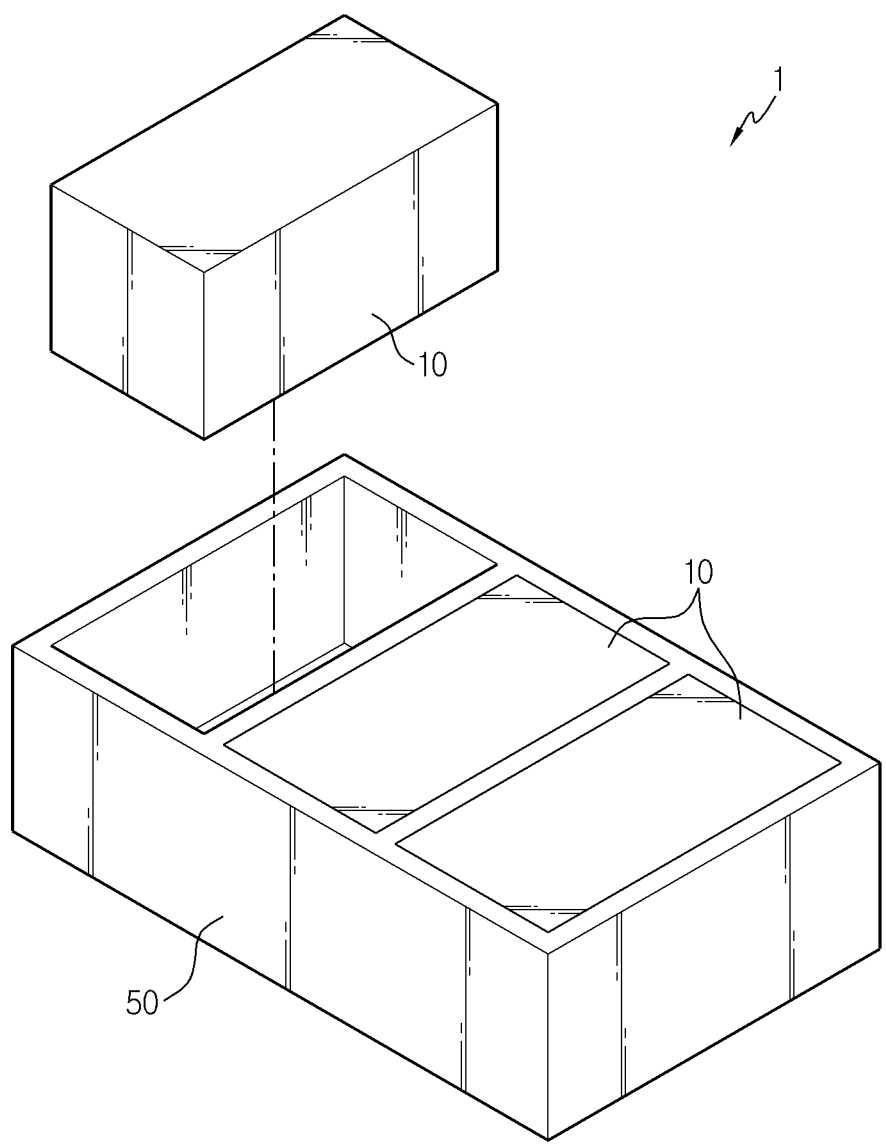
FIG. 5 is a perspective diagram for illustrating a battery pack according to an embodiment of the present disclosure.
Figure 6:
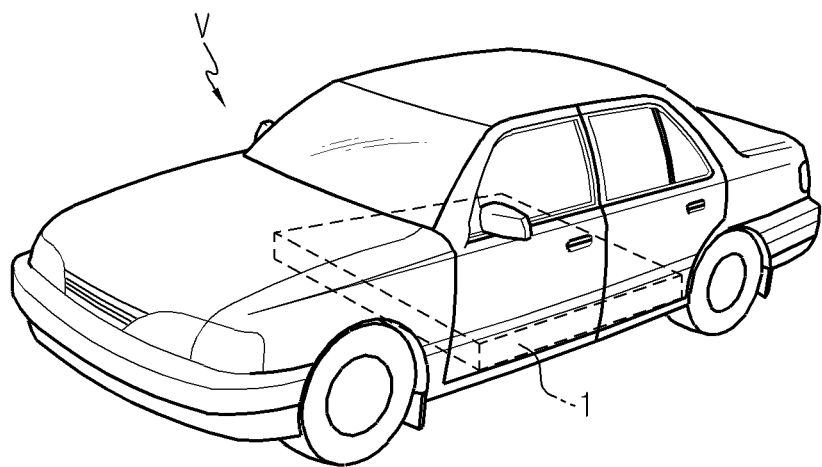
FIG. 6 is a perspective diagram for illustrating a vehicle according to an embodiment of the present disclosure.

FIG. 5 is a perspective diagram for illustrating a battery pack according to an embodiment of the present disclosure, and FIG. 6 is a perspective diagram for illustrating a vehicle according to an embodiment of the present disclosure.

Referring to FIGS. 5 and 6, a battery pack 1 may include at least one battery module 10 according to the former embodiment and a pack case 50 for packaging the at least one battery module 10.

The battery pack 1 may be provided to a vehicle V as a fuel source of the vehicle V. As an example, the battery pack 1 may be provided to an electric vehicle, a hybrid vehicle, and various other-type vehicles V capable of using the battery pack 1 as a fuel source.

In addition, the battery pack 1 may be provided in other devices, instruments or facilities such as an energy storage system using a secondary battery, in addition to the vehicle V.

As described above, the battery pack 1 of this embodiment and devices, instruments or facilities such as the vehicle V, which have the battery pack 1, include the battery module 10 as described above, and thus it is possible to implement a battery pack 1 having all the advantages of the battery module 10 described above, or devices, instruments, facilities or the like such as the vehicle V, which have the battery pack 1.

According to various embodiments as above, it is possible to provide a battery module 10, which may improve a cooling temperature deviation of the battery cell 100, a battery pack 1 including the battery module 10, and a vehicle including the battery pack 1.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
at least one battery cell having opposing first and second sides and having opposing third and fourth sides, the at least one battery cell including a first electrode lead positioned on the first side and a second electrode lead positioned on the second side;
a bus bar assembly including a first connection bus bar and a second connection bus bar, the first connection bus bar being positioned along the first side of the at least one battery cell and connected to the first electrode lead, and the second connection bus bar being positioned along the second side of the at least one battery cell and connected to the second electrode lead; and
a heatsink assembly positioned in contact with both of the at least one battery cell and the bus bar assembly, the heatsink assembly encircling both of the at least one battery cell and the bus bar assembly by extending along the first and second sides of the at least one battery cell and extending in contact with the third and fourth sides of the at least one battery cell, wherein the heatsink assembly includes:
a first heatsink portion extending along the first side of the at least one battery cell in contact with either or both of the first connection bus bar and the first electrode lead;
a second heatsink portion extending along the second side of the at least one battery cell in contact with either or both of the second connection bus bar and the second electrode lead;
a third heatsink portion extending along and in contact with the third side of the at least one battery cell; and
a fourth heatsink portion extending along and in contact with the fourth side of the at least one battery cell,
wherein each of the first, second, third, and fourth heatsink portions includes a respective internal passageway, the internal passageways being interconnected so as to collectively define a flow path configured to allow a coolant to flow therethrough.

2. The battery module according to claim 1, wherein the bus bar assembly includes:
a bus bar housing mounted to the first and second sides of the at least one battery cell, the first and second connection bus bars being coupled to the bus bar housing;
and
a first heat transfer member and a second heat transfer member thermally coupled to the respective first and second connection bus bars or the first and second electrode leads, so as to transfer heat generated at the first and second electrode leads or the first and second connection bus bars to the heatsink assembly.

3. The battery module according to claim 2,
wherein the first and second heat transfer members are mounted to the respective first and second connection bus bars so as to be in direct contact with the respective first and second connection bus bars and with the heatsink assembly.

4. The battery module according to claim 2, wherein the first and second heat transfer members are made of a thermal interface material.

5. The battery module according to claim 1, wherein the internal passageway of the third heatsink portion is connected to a coolant supply unit for supplying the coolant to the third heatsink portion from outside of the heatsink assembly, and wherein the internal passageway of the fourth heatsink portion is connected to a coolant discharge unit for discharging the coolant from the fourth heatsink portion to outside of the heatsink assembly.

6. The battery module according to claim 5, wherein each of the first and second heatsink portions extend between and interconnect the third and fourth heatsink portions, such that the internal passageways of the third and fourth heatsink portions communicate with one another via the internal passageways of the first and second heatsink portions.

7. The battery module according to claim 6, wherein the internal passageways of the first, second, third, and fourth heatsink portions are configured such that the coolant supplied from the coolant supply unit flows along the internal passageway of the third heatsink portion to the internal passageway of the respective first and second heatsink portions, and then the coolant flows through the internal passageway of the fourth heatsink portion to the coolant discharge unit.

8. A battery pack, comprising:
at least one battery module according to claim 1; and
a pack case configured to receive the at least one battery module therein.

9. A vehicle, comprising:
at least one battery pack according to claim 8.

10. The battery module according to claim 1, wherein the heatsink assembly covers the at least one battery cell and the bus bar assembly such that a separate module case is omitted.

* * * * *